(12) United States Patent
Rosseel et al.

(10) Patent No.: US 10,073,850 B2
(45) Date of Patent: Sep. 11, 2018

(54) SYSTEM AND COMPUTER PROGRAM PRODUCTS TO TRANSFORM LARGE AMOUNTS OF FILES

(71) Applicants: DOCBYTE NV, Sint-Denijs-Westrem (BE); Docshifter BVBA, Ghent (BE)

(72) Inventors: Frederik Hilaire Leon Rosseel, Oosterzele (BE); Michiel Luc Nathalie Van Driessche, Wondelgem (BE); Maxime Vermeir, Zele (BE)

(73) Assignees: DOCBYTE NV, Sint-Denijs-Westrem (BE); DOCSHIFTER BVBA, Ghent (BE)

( * ) Notice: Subject to any disclaimer, the term of this patent is extended or adjusted under 35 U.S.C. 154(b) by 213 days.

(21) Appl. No.: 14/895,692

(22) PCT Filed: May 7, 2015

(86) PCT No.: PCT/EP2015/060110
§ 371 (c)(1),
(2) Date: Dec. 3, 2015

(87) PCT Pub. No.: WO2015/188993
PCT Pub. Date: Dec. 17, 2015

(65) Prior Publication Data
US 2016/0224571 A1    Aug. 4, 2016

(30) Foreign Application Priority Data

Jun. 12, 2014   (EP) .................................... 14172201

(51) Int. Cl.
*G06F 17/00*   (2006.01)
*G06F 17/30*   (2006.01)
(Continued)

(52) U.S. Cl.
CPC ...... *G06F 17/30076* (2013.01); *G06F 3/0481* (2013.01); *G06F 3/0484* (2013.01);
(Continued)

(58) Field of Classification Search
CPC ................. G06F 17/2247; G06F 17/24; G06F 17/30017; G06F 17/30896
See application file for complete search history.

(56) References Cited

U.S. PATENT DOCUMENTS

2003/0182450 A1    9/2003  Ong et al.
2009/0119416 A1*   5/2009  Sirdevan ................ G06Q 10/06
                                                                709/246
(Continued)

FOREIGN PATENT DOCUMENTS

JP    2001319069 A    11/2001
WO    2013043739 A1    3/2013

OTHER PUBLICATIONS

International Search Report for corresponding International PCT Application No. PCT/EP2015/060110, dated Jul. 29, 2015.

*Primary Examiner* — Truong Vo
(74) *Attorney, Agent, or Firm* — Workman Nydegger (57) ABSTRACT

A system to transform large amounts of files comprises input modules that handle incoming files, transformation modules that transform incoming files in a respective source format into outgoing files in a respective destination format and release modules that handle outgoing files. A web interface enabling a user to configure workflows comprising an input module, one or more transformation modules and one or more release modules. A workflow database, a task queue to store tasks resulting from the workflows. A sender service that loads a workflow, executes an input module thereof, and stores tasks resulting from the workflow in the task queue. A receiver service that reads a task from the task queue, loads a corresponding workflow, and executes the transfor- (Continued)

mation modules and release modules of the workflow to transform incoming files into outgoing files.

12 Claims, 3 Drawing Sheets

(51) Int. Cl.
    *G06F 3/12*          (2006.01)
    *G06F 17/22*        (2006.01)
    *G06F 3/0481*      (2013.01)
    *G06F 3/0484*      (2013.01)
    *G06F 17/21*        (2006.01)
    *G06K 15/02*        (2006.01)

(52) U.S. Cl.
    CPC .......... *G06F 3/1206* (2013.01); *G06F 3/1247* (2013.01); *G06F 3/1248* (2013.01); *G06F 3/1263* (2013.01); *G06F 3/1275* (2013.01); *G06F 3/1285* (2013.01); *G06F 3/1288* (2013.01); *G06F 17/211* (2013.01); *G06F 17/2205* (2013.01); *G06F 17/2264* (2013.01); *G06F 17/30011* (2013.01); *G06K 15/1859* (2013.01)

(56) References Cited

U.S. PATENT DOCUMENTS

| | | |
|---|---|---|
| 2009/0138540 A1 | 5/2009 | Peng et al. |
| 2013/0047135 A1 | 2/2013 | Joshi et al. |
| 2014/0129607 A1 | 5/2014 | Nagumo |

* cited by examiner

SYSTEM AND COMPUTER PROGRAM PRODUCTS TO TRANSFORM LARGE AMOUNTS OF FILES

FIELD OF THE INVENTION

The present invention generally relates to the transformation of electronic files or documents, i.e. the conversion of files from a source format to a destination format. The invention in particular provides a solution for enterprise grade file transformations, i.e. the conversion of large amounts of files from one or several source formats to one or several target formats.

BACKGROUND OF THE INVENTION

In enterprises many situations or applications exist wherein large amounts of digital files available in one or several source formats have to be converted into one or several target formats or destination formats. In a print shop for instance, source files received from customers in jpg, tif, gif, bmp, pdf, ppt . . . formats have to be transformed into a target format suitable for the printers available in the print shop. In large corporations, vast amounts of documents available in various source formats like for instance thousands of invoices available in doc or xls format may have to be transformed into a target format suitable for archiving, e.g. pdf. Etc. As a consequence, there is a general need for scalable tools that automatically handle the transformation of vast amount of electronic files from various source formats into various destination formats.

It is well known to install a printer driver in each application that needs to convert files. As an example, a pdf printer driver may be installed in an Open Office application on a personal computer, laptop or tablet enabling the transformation of files that are accessed through the Open Office application into pdf format. Such printer drivers have to be installed or configured in each application wherein they will be used, they typically transform a single source format into a single destination format, lack scalability and modularity and consequently are not useful in situations wherein large amounts of files have to be transformed and/or situations wherein multiple input formats and multiple output formats must be supported.

To avoid that users have to manually plug-in file conversion tools in applications such as a browser, Japanese Patent Application JP 2001319069 entitled "File Conversion System, Web Server, File Converting Method, and Medium with Recorded File Converting Program" describes an online service that allows to upload a file, transform a file in a target format specified by the user, and makes available the transformed file upon execution of a payment for the online service. Although the service known from JP 2001319069 releases the user from the burden of installing file conversion plug-ins, it does not offer a scalable solution for enterprise grade file transformations.

United States Patent Application US 2009/0138540 entitled "File Conversion System and Method Used Thereby" describes a system and method for conversion of files that are sent over a network from a sender to a receiving device, e.g. a mobile device, a PDA, . . . As described in paragraph [0024] of US 2009/0138540, the system contains a database that maintains a list of supported formats for the receiving devices and uses this database to ensure that files sent to a receiving device arrive with that receiving device in a format, i.e. codec, resolution, screen size, . . . , that is supported by the receiving device. Apart from the supported formats database, the system known from US 2009/0138540 contains receiving modules, converting modules and transmitting modules that receive, convert and transmit a file to the receiving device, or deliver a network address specifying the converted file's location to the receiving device.

The system and method known from US 2009/0138540 is restricted to applications wherein files are sent over a network from a sender device to a receiver device that support different formats. It requires maintenance of a database of supported formats for the wide variety of existing portable and non-portable devices and it is not scalable to handle vast amounts of files, e.g. thousands or even hundred thousands of files that need to undergo a similar transformation.

United States Patent Application US 2003/0182450 entitled "Generic Infrastructure for Converting Documents Between Formats with Merge Capabilities" describes a platform for converting/merging files from a small device format to a server format. Format conversion modules can be plugged-in dynamically at runtime. Although the ability to plug-in conversion modules offers flexibility, the platform known from US 2003/0182450 lacks the scalability and load balancing advantages that are required for enterprise grade file transformations.

The best existing solution for enterprise grade file transformations is described in international patent application WO 2013/043739 entitled "Systems, Methods and Articles to Automatically Transform Documents Transmitted Between Senders and Recipients". The system known from WO 2013/043739 extracts information from received documents, generates or selects transformation instructions, transforms the documents into a generic internal format, and at last generates an output document in the desired destination format. As is illustrated by 408 in FIG. 4, the system of WO 2013/043739 is queue based.

The system known from WO 2013/043739 is disadvantageous for several reasons. The system is focused on maintaining the information and positioning of information in official documents such as bank notes. It thereto makes use of an internal DTS format. The conversion of documents into such internal generic format is a cumbersome, additional step that reduce the scalability of the system, i.e. the ability to handle vast amount of documents within an acceptable time interval, and the modularity of the system, i.e. its ability to support additional source or destination formats.

United States Patent Application US 2013/0047135 entitled "Enterprise Computing Platform" describes a platform that transforms data from a source data format into one or plural destination data formats. Although the term "document transformation" is used, for instance in the Abstract of US 2013/0047135, the platform only transforms data in the source document. The platform known from US 2013/0047135 does not transform the document or file itself, i.e. the container of the data. This is explicitly acknowledged for instance in paragraph [00247] ". . . a source document can be used as starting point, and the data therein can be transformed to transformed documents . . . ". The platform disclosed in US 2013/0047135 is typically used in the Enterprise Service Bus or ESB, a technology developed to route and translate data or messages between loosely coupled software components, called services, that are independently deployed, heterogeneous and disparate. In ESB, there is typically a single source data format that is transformed into multiple destination data formats.

It is an objective of the present invention to disclose a system and method for transformation of files that overcomes the disadvantages of prior art solutions addressed here above. More particularly, it is an objective of the present invention to disclose a system and method for transformation of files that is scalable to enterprise grade transformation applications, and that is modular to support simple or complex transformations from any source format to any destination format. It is a further objective to provide a system and method for transformation of files that supports load balancing across various servers, online/on-site installation, and prioritizing certain transformations.

SUMMARY OF THE INVENTION

According to the present invention, the above identified objectives are achieved by a system adapted to transform large amounts of files, the system supporting plural source formats and plural destination formats for the files, and the system comprising:

plural input modules, wherein each input module is adapted to handle incoming files;

plural transformation modules, wherein each transformation module is adapted to transform incoming files in a respective source format into outgoing files in a respective destination format;

plural release modules, wherein each release module is adapted to handle outgoing files;

a web interface enabling a user of the system to configure workflows, each workflow comprising an input module, one or more of the transformation modules and one or more of the release modules;

a workflow database adapted to store the workflows, input modules, transformation modules and release modules;

a task queue adapted to store tasks resulting from one or more of the workflows;

a sender service adapted to load a workflow from the workflow database, to execute an input module of the workflow to thereby verify if conditions for execution of the workflow are fulfilled, and to store tasks with parameters resulting from the workflow in the task queue; and a receiver service adapted to read a task from the task queue, to load a corresponding workflow from the workflow database, and to execute the one or more transformation module and the one or more release module of the corresponding workflow with parameters that form part of the task to thereby transform one or more incoming files handled by the input module of the corresponding workflow into outgoing files handled by the one or more release module of the corresponding workflow.

Thus, the invention concerns a workflow-based system that comprises multiple components that communicate over a task queue. The workflows are composed by a user and stored in a workflow database. A basic workflow consists of an input module, a transformation module and a release module, but more complex workflows chaining several transformation modules can be composed as well. An input module is a pluggable component that handles incoming files, i.e. it identifies the location where incoming files that must be transformed are located and it specifies the conditions that must be fulfilled by incoming files in order to be transformed. An input module may for instance specify that all MS Word documents located in a specific map on a network drive, and whose file size is below 5 Megabytes, must be transformed into pdf format. A transformation module is a pluggable component that converts a file in a source format into a file in destination format. Referring to the above example, a transformation module may for instance be a doc-to-pdf conversion software module. A release module is a pluggable component that handles outgoing files, i.e. it identifies the location where the transformed, outgoing files can be found. A release module in the above example may for instance specify the path to the pdf files.

The system according to the invention basically consists of a sender service and receiver service that communicate through the task queue. The sender service loads a workflow from the workflow database and executes the input module of the workflow. As mentioned here above, the input module defines the location of the files that must be transformed and the conditions/parameters for transformation of these files. When the sender service detects a file to be transformed, i.e. when it detects at the location specified by the input module a file that satisfies the conditions for being transformed, it will add a task to the task queue. The receiver service listens to the task queue and executes the tasks stored in the task queue in FIFO (first-in-first-out) order. The receiver thereto contacts the workflow database, loads the workflow corresponding to a task, and executes the transformation module(s) and the release module(s) belonging to that workflow. As a result of executing the task, an incoming file will be transformed from a source format into one or plural destination formats, and the paths to the transformed files will be released by the release module(s).

New input modules, transformation modules and release modules can be plugged into the system, e.g. through an upload interface, as a result of which the system can be extended to support new source formats and new destination formats in a modular, flexible and user-friendly manner. As a result of the modular approach, a single system according to the present invention supports multiple transformations. In addition, the workflow-based approach enables to transform thousands of files through activation of a single workflow, rendering the system scalable and suitable for enterprise grade file transformations. The system can be installed on-site within an enterprise, or off-site as an online service. Furthermore, the architecture with a sender and receiver communicating over a task queue enables load balancing and prioritization as will be explained further below.

According to an optional aspect of the system adapted to transform files according to the present invention, each input module is adapted to define a location of incoming files to be transformed, and conditions to be fulfilled for transforming the incoming files.

Indeed, an input module is a pluggable component that specifies where incoming files can be found, and what conditions must be fulfilled for the incoming files to be transformed. Input modules thus handle different file sources such as a file system, dropbox, web service, documentum, etc. An input module may for instance be a file system poller that looks for files in a specific file folder on a network drive. The conditions may for instance concern the type of file (e.g. only pdf files must be transformed), a minimum size for the file (e.g. only files greater than 5 kbytes must be transformed), a maximum size for the file (e.g. only files smaller than 5 Megabytes must be transformed), a maximum age (e.g. only files created in the last month must be transformed), a lower bound for the date of creation of the file (e.g. only files created or updated after 1 Jan. 2013 must be transformed), etc.

According to another optional aspect of the system adapted to transform files according to the present invention, each release module is adapted to define a location of outgoing files, and adapted to deliver a path to the location of outgoing files.

Indeed, an output module is a pluggable component or agent that specifies where and how the transformed, outgoing files should be released. Release modules thus handle different destinations such as a file system, dropbox, web service, documentum, etc. The release module may for instance specify that outgoing files in pdf format must be released into a specific folder. The release module may provide as output a path specification to the specific folder.

According to yet another optional aspect of the system adapted to transform files according to the present invention, a workflow comprises a plurality of transformation modules that are chained.

This way, by chaining multiple transformation modules into a single workflow, more complex transformation configurations can be executed. Hence, a file can be transformed into plural, different destination formats that are stored on different locations.

Optionally, the system adapted to transform files according to the present invention, further comprises:

a second task queue adapted to store high priority tasks resulting from one or more of the workflows.

Indeed, the system may be provided with a second, high priority queue whose tasks are prioritized over the first, standard queue. The receiver service first handles tasks from the high priority queue. Tasks from the standard queue are handled by the receiver service as soon as the high priority queue is empty.

Also optionally, the system adapted to transform files according to the present invention, further comprises:

a printer service adapted to load a workflow from the workflow database, to execute an input module of the workflow to thereby verify if conditions for execution of the workflow are fulfilled, and to store high priority tasks resulting from the workflow in the second task queue.

Thus, the printer service is a kind of sender service that may for instance be installed as a printer on a user's computer, and that generates high priority tasks that are by default stored in and handled through the high priority queue.

In line with another optional aspect of the system adapted to transform files according to the present invention, the task queue is a first-in first-out or FIFO queue.

Indeed, preferably, the standard queue and also the high priority queue are implemented as first-in-first-out queues or FIFO queues from which the receiver service reads tasks in the order wherein these tasks were entered in the queue by the sender service. Thus, the only way for a task to become executed before a task that has been entered already in the task queue, is by using the high priority queue.

Further optionally, the system adapted to transform files according to the present invention comprises:

plural sender services being configured to run on different servers; and/or plural receiver services being configured to run on different servers.

Indeed, the system according to the present invention may integrate plural sender services or plural receiver services or plural sender and receiver services, running on different servers thereby enabling load balancing.

According to yet another optional aspect, the system adapted to transform files according to the present invention further comprises:

an upload interface for the input modules, the transformation modules and the release modules, the upload interface being adapted to require for an uploaded module a JavaScript Object Notation or JSON file comprising a description of the module and a zip archive file comprising classes for the module.

Hence, new input modules, transformation modules and/or release modules can be plugged into the system through an upload interface that requires a JSON file containing a description of the module and a zip file containing the classes of the module.

As is further specified, the description of a module comprises:

a name of the module;

a classname of a class of the module;

a type specification of the module, i.e. either input, transformation or release;

a text description of the module; and a parameter list of the module.

In addition to a system for transforming files, the present invention also relates to a corresponding computer-implemented method of transforming large amounts of files, the method supporting plural source formats and plural destination formats for the files, and the method comprising:

storing in a workflow database:

plural input modules, wherein each input module is adapted to handle incoming files;

plural transformation modules, wherein each transformation module is adapted to transform incoming files in a respective source format into outgoing files in a respective destination format;

plural release modules, wherein each release module is adapted to handle outgoing files; and workflows, wherein each workflow comprises an input module, one or more of the transformation modules and one or more of the release modules;

loading a workflow from the workflow database into a sender service, executing an input module of the workflow to thereby verify if conditions for execution of the workflow are fulfilled, and storing tasks with parameters resulting from the workflow in a task queue; and reading a task from the task queue into a receiver service, loading a corresponding workflow from the workflow database into the receiver service, and executing the one or more transformation module and the one or more release module of the corresponding workflow with parameters that form part of the task to thereby transform one or more incoming files handled by the input module of the corresponding workflow into outgoing files handled by the one or more release module of the corresponding workflow.

The present invention further also relates to a data processing system comprising means for carrying out the method according to the invention.

As further specified, the present invention relates to a computer program comprising software code adapted to perform the method, and to a computer readable storage medium comprising the computer program.

DETAILED DESCRIPTION OF EMBODIMENT(S)

Figure 1:
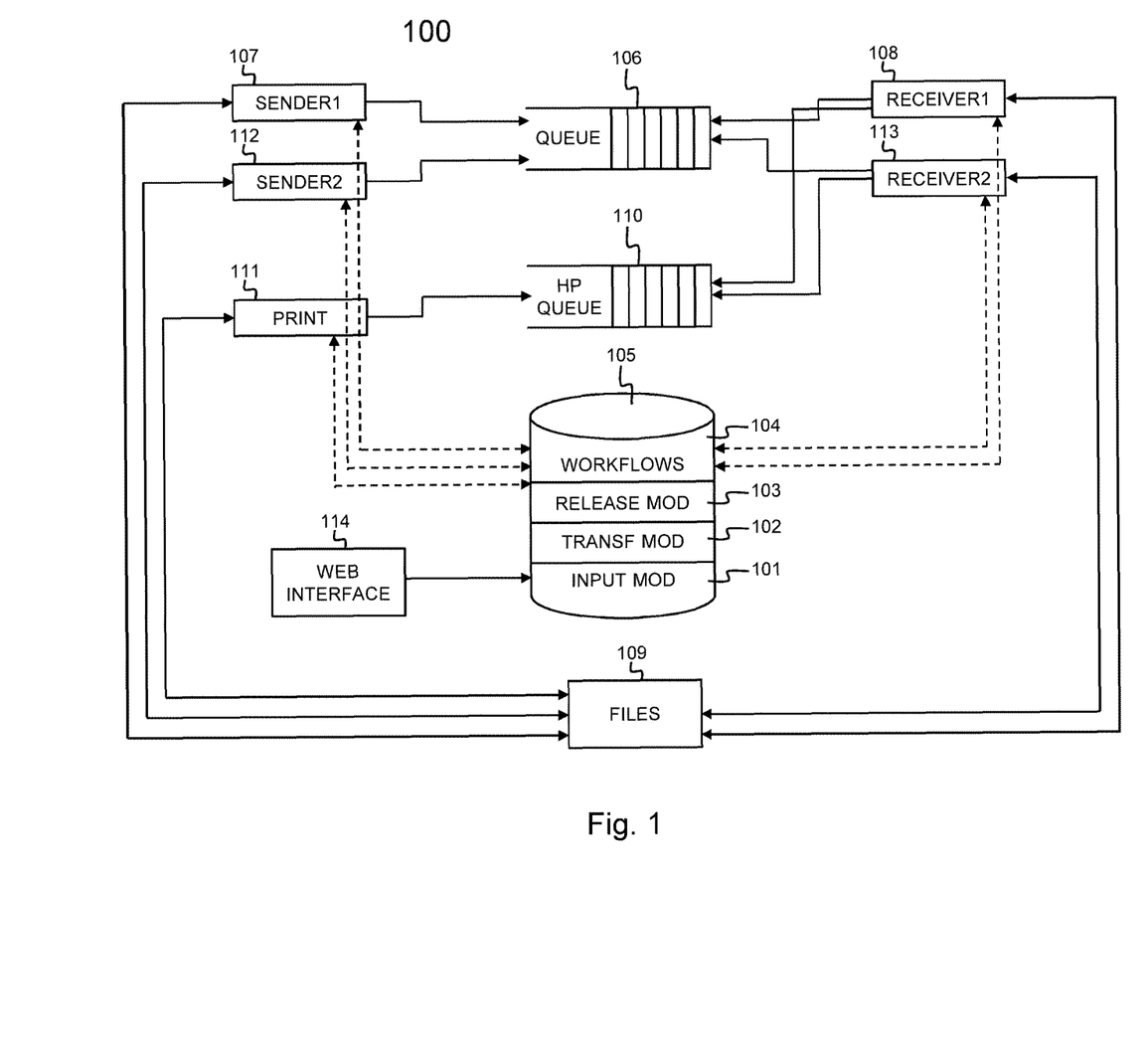
FIG. 1 is a functional block scheme of an embodiment of the system for transforming files in accordance with the present invention.

FIG. 1 shows a system 100 for enterprise grade file transformations. The system consists of multiple functional blocks or components that communicate over a Java Message Service or JMS queue 106. The system 100 also contains a second JMS queue 110, the so called high priority queue or HP QUEUE 110 that is prioritized over QUEUE 106.

Central to system 100 is a database 105 that stores input modules, INPUT MOD or 101, transformation modules, TRANSF MOD or 102, release modules, RELEASE MOD or 103, and workflows 104. Input modules are software components that handle incoming files. Release modules are software components that handle outgoing files. A release module in other words specifies how and where a transformed file will be released, for instance by specifying the folder or the path to a folder where the transformed files are stored. Transformation modules are software components that transform incoming files having a specific source format into outgoing files having a specific destination format. A basic workflow exists of an input module, a transformation module and a release module. More complex workflows contain a chain of plural transformation modules and plural release modules enabling to transform incoming files having a specific source format to outgoing files having multiple, different destination formats that can be stored on multiple, different locations. The workflows 104 are uploaded via an HTML web interface 114, i.e. an application that runs on a client device, e.g. a desktop or laptop computer, and allows the user to configure workflows through a drag and drop interface, and to store the configured workflows in database 105. Web interface 114 can also be used to upload new input modules, new transformation modules and/or new release modules into database 105.

FIG. 1 further shows a first sender service, SENDER1 or 107, and a second sender service, SENDER2 or 112, that both contact the same JMS queue 106. A sender service, 107 or 112, is a component that handles the input modules of the different workflows 104. A sender service like 107 in other words interacts with database 105 to load workflows. For an uploaded workflow, the sender service 107 executes the corresponding input module as a result of which it will look at a specified location, e.g. a folder in files store 109 for incoming files that satisfy certain conditions specified by the input module. The conditions may for instance be the type of the file, the size of the file, the age of the file, etc. When the sender service 107 detects at the specified location a new file that satisfies the conditions specified in the input module, the sender service 107 shall send a task to queue 106. The task is a request to transform the file in accordance with the workflow.

Depending on the needs of for instance the enterprise where system 100 is installed, multiple senders like 107 and 112 can be installed on different servers. These senders 107 and 112 send tasks to the same queue 106 that treats these tasks on FIFO (first-in-first-out) basis.

In order to be able to handle high priority tasks, a second queue 110 is installed in system 100. Tasks that enter the high priority queue 110 are processed before tasks stored in queue 106 are processed. Tasks in queue 106 in other words are only processed when queue 110 is empty.

In addition to the two sender services 107 and 112 that send tasks to queue 106, FIG. 1 also shows a printer service 111. This printer service 111 is a particular type of sender service that also interacts with the database 105, loads workflows and executes the corresponding input modules. The tasks generated by the printer service 111 however enter the high priority queue 110 as a result of which they are always prioritized over pending tasks from the other sender services 107 and 112. This gives user of the system 100 the possibility to install a printer service on their client computers. When printing to this printer service, a file transformation task is sent to a queue that has priority over the standard queue handling other file transformations.

FIG. 1 at last shows receiver services: RECEIVER1 or 108 and RECEIVER2 or 113. A receiver service is a component that reads and processes tasks from a queue. When a receiver, 108 or 113, looks for a task to process, it will process the next task in the queue, i.e. the next task in queue 110 or—in case queue 110 is empty—the next task in queue 106. This way, the FIFO order is guaranteed. After having read a task, the receiver service 108 shall interact with database 105 to load the corresponding workflow and execute the transformation module(s) and release module(s) that form part of that workflow. As a result of executing the transformation module(s), an incoming file, found at a specified location in file store 109, is format converted into one or plural destination formats. Each release module that forms part of the workflow specifies the path to a converted file, e.g. the path to a folder in file store 109 where an outgoing file in a destination format is stored. Multiple release modules may form part of a single workflow. This gives the user the possibility to add a release in the middle of a chain of transformations which may be useful if the user wants a transformed file to be released but also wants to execute a further transformation on the transformed file.

When an enterprise that uses system 100 detects that transformation tasks can't be processed in an acceptable time, an extra receiver service can be installed on an additional server. As a result, the load on the receiver services will be rebalanced and the time for processing transformation tasks will be reduced.

Figure 2:
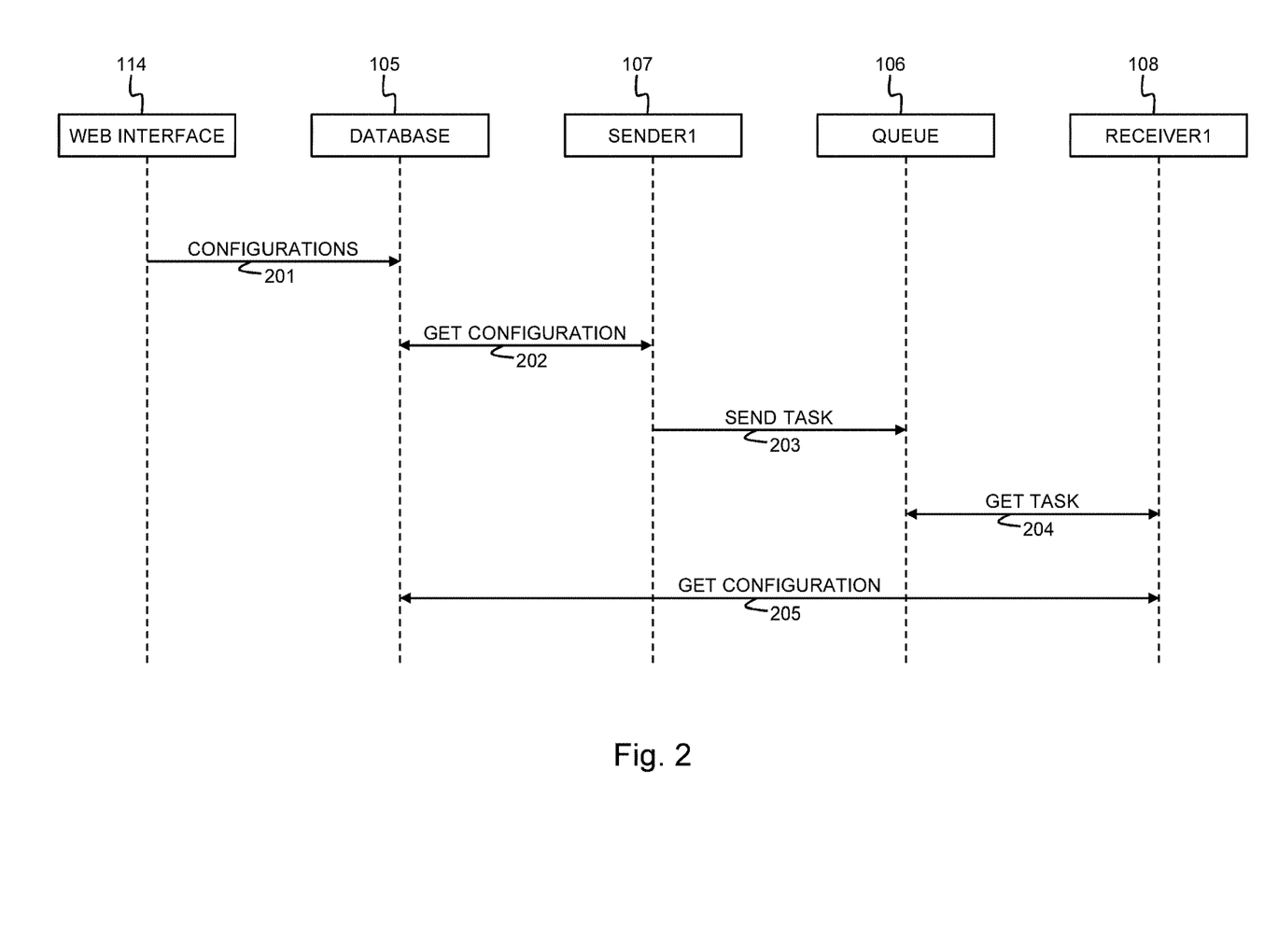
FIG. 2 is a diagram illustrating an embodiment of the method for transforming files in accordance with the present invention.

FIG. 2 illustrates an embodiment of the method to transform a file according to the present invention. More particularly, FIG. 2 shows a typical communication flow between the web interface 114, database 105, sender service 107, queue 106 and receiver service 108 of the system depicted in FIG. 1. In a first step, the user configures one or several workflows using the web interface 114 and uploads the configurations 201 into workflow database 105. In a second step, sender service 107 interacts with database 105 to load a workflow. This is indicated by GET CONFIGURATION 202 in FIG. 2: the sender service 107 sends a request to the database 105 and in return gets a workflow. The sender service 107 thereupon loads and executes the input module that forms part of the workflow. If, as a result of execution of the input module, a file is found that must be transformed, the receiver service 107 sends a task 203 to queue 106. The receiver service 108 interacts with the queue 106 and reads the task from the queue 106 as is indicated by GET TASK 204 in FIG. 2. The receiver service 108 thereupon interacts with the database 105 to load the corresponding workflow. This is illustrated by GET CONFIGURATION 205 in FIG. 2: the receiver service 108 sends a request for the corresponding workflow to the database, receives the corresponding workflow in response to its request, and starts executing the transformation modules and the release modules of the uploaded workflow. As a result, the file transformation task will be executed and the path to the location of the transformed file will be released.

Figure 3:
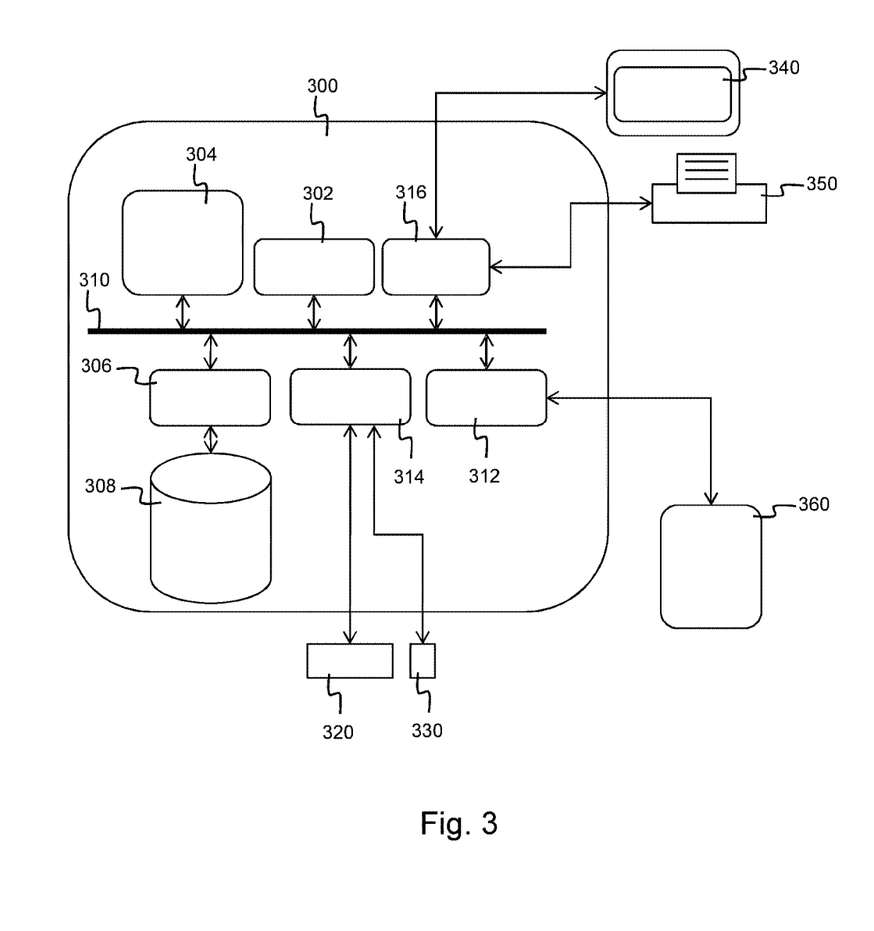
FIG. 3 shows a computing system suitable for hosting the system for transforming files according to the present invention and suitable for implementing the method for transforming files according to the present invention.

FIG. 3 shows a suitable computing system 300 for hosting the system of FIG. 1. Computing system 300 may in general be formed as a suitable general purpose computer and comprise a bus 310, a processor 302, a local memory 304, one or more optional input interfaces 314, one or more optional output interfaces 316, a communication interface 312, a storage element interface 306 and one or more storage elements 308. Bus 310 may comprise one or more conductors that permit communication among the components of the computing system. Processor 302 may include any type of conventional processor or microprocessor that interprets and executes programming instructions. Local memory 304 may include a random access memory (RAM) or another type of dynamic storage device that stores information and instructions for execution by processor 302 and/or a read only memory (ROM) or another type of static storage device that stores static information and instructions for use by processor 304. Input interface 314 may comprise one or more conventional mechanisms that permit an operator to input information to the computing device 300, such as a keyboard 320, a mouse 330, a pen, voice recognition and/or biometric mechanisms, etc. Output interface 316 may comprise one or more conventional mechanisms that output information to the operator, such as a display 340, a printer 350, a speaker, etc. Communication interface 312 may comprise any transceiver-like mechanism such as for example two 1Gb Ethernet interfaces that enables computing system 300 to communicate with other devices and/or systems, for example mechanisms for communicating with one or more other computing systems. The communication interface 312 of computing system 300 may be connected to such another computing system 360 by means of a local area network (LAN) or a wide area network (WAN, such as for example the internet, in which case the other computing system may for example comprise a suitable web server. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example 1TB SATA disk drives, and control the reading and writing of data to and/or from these storage elements 308. Although the storage elements 308 above is described as a local disk, in general any other suitable computer-readable media such as a removable magnetic disk, optical storage media such as a CD or DVD, -ROM disk, solid state drives, flash memory cards, . . . could be used.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system adapted to transform large amounts of files, said system supporting plural source formats and plural destination formats for said files, said system comprising:
   plural input modules, wherein each input module is adapted to handle incoming files;
   plural transformation modules, wherein each transformation module is adapted to transform incoming files in a respective source format into outgoing files in a respective destination format;
   plural release modules, wherein each release module is adapted to handle outgoing files;
   a web interface enabling a user of said system to configure workflows, each workflow comprising an input module, one or more of said transformation modules and one or more of said release modules;
   a workflow database adapted to store said workflows, input modules, transformation modules and release modules;
   a task queue adapted to store tasks resulting from one or more of said workflows;
   a sender service adapted to load a workflow from said workflow database, to execute an input module of said workflow to thereby verify if conditions for execution of said workflow are fulfilled, and to store tasks with parameters resulting from said workflow in said task queue; and
   a receiver service adapted to read a task from said task queue, to load a corresponding workflow from said workflow database, and to execute the one or more transformation module and the one or more release module of said corresponding workflow with parameters that form part of said task to thereby transform one or more incoming files handled by the input module of said corresponding workflow into outgoing files handled by the one or more release module of said corresponding workflow.

2. A system adapted to transform files according to claim 1,
   wherein each input module of said input modules is adapted to define a location of incoming files to be transformed, and conditions to be fulfilled for transforming said incoming files.

3. A system adapted to transform files according to claim 1,
   wherein each release module of said release modules is adapted to define a location of outgoing files, and adapted to deliver a path to said location of outgoing files.

4. A system adapted to transform files according to claim 1,
wherein a workflow of said workflows comprises a plurality of said transformation modules that are chained.

5. A system adapted to transform files according to claim 1, further comprising:
a second task queue adapted to store high priority tasks resulting from one or more of said workflows.

6. A system adapted to transform files according to claim 5, further comprising:
a printer service adapted to load a workflow from said workflow database, to execute an input module of said workflow to thereby verify if conditions for execution of said workflow are fulfilled, and to store high priority tasks resulting from said workflow in said second task queue.

7. A system adapted to transform files according to claim 1,
wherein said task queue is a first-in first-out or FIFO queue.

8. A system adapted to transform files according to claim 1, comprising:
plural sender services similar to said sender service, said plural sender services being configured to run on different servers; and/or
plural receiver services similar to said receiver service, said plural receiver services being configured to run on different servers.

9. A system adapted to transform files according to claim 1, further comprising:
an upload interface for said input modules, said transformation modules and said release modules, said upload interface being adapted to require for an uploaded module a JavaScript Object Notation or JSON file comprising a description of said module and a zip archive file comprising classes for said module.

10. A system adapted to transform files according to claim 9, wherein said description of said module comprises:
a name of said module;
a classname of a class of said module;
a type specification of said module, i.e. either input, transformation or release;
a text description of said module; and
a parameter list of said module.

11. A computer-implemented method of transforming large amounts of files, said method supporting plural source formats and plural destination formats for said files, said method comprising:
storing in a workflow database:
plural input modules, wherein each input module is adapted to handle incoming files;
plural transformation modules, wherein each transformation module is adapted to transform incoming files in a respective source format into outgoing files in a respective destination format;
plural release modules, wherein each release module is adapted to handle outgoing files; and
workflows, wherein each workflow comprises an input module, one or more of said transformation modules and one or more of said release modules;
loading a workflow from said workflow database into a sender service, executing an input module of said workflow to thereby verify if conditions for execution of said workflow are fulfilled, and storing tasks with parameters resulting from said workflow in a task queue; and
reading a task from said task queue into a receiver service, loading a corresponding workflow from said workflow database into said receiver service, and executing the one or more transformation module and the one or more release module of said corresponding workflow with parameters that form part of said task to thereby transform one or more incoming files handled by the input module of said corresponding workflow into outgoing files handled by the one or more release module of said corresponding workflow.

12. A non-transitory computer-readable storage medium having stored thereon executable instructions that when executed by the one or more processors configure a computer system to perform the following steps of a method of transforming large amounts of files, said method supporting plural source formats and plural destination formats for said files, said steps comprising:
storing in a workflow database
plural input modules, wherein each input module is adapted to handle incoming files,
plural transformation modules, wherein each transformation module is adapted to transform incoming files in a respective source format into outgoing files in a respective destination format,
plural release modules, wherein each release module is adapted to handle outgoing files, and
workflows, wherein each workflow comprises an input module, one or more of said transformation modules and one or more of said release modules;
loading a workflow from said workflow database into a sender service, executing an input module of said workflow to thereby verify if conditions for execution of said workflow are fulfilled, and storing tasks with parameters resulting from said workflow in a task queue; and
reading a task from said task queue into a receiver service, loading a corresponding workflow from said workflow database into said receiver service, and executing the one or more transformation module and the one or more release module of said corresponding workflow with parameters that form part of said task to thereby transform one or more incoming files handled by the input module of said corresponding workflow into outgoing files handled by the one or more release module of said corresponding workflow.

* * * * *